(12) United States Patent
Jeannot et al.

(10) Patent No.: US 7,880,898 B2
(45) Date of Patent: *Feb. 1, 2011

(54) METHOD FOR MEASURING THREE-DIMENSIONAL OBJECTS BY SINGLE-VIEW OPTICAL SHADOWGRAPHY, USING THE OPTICAL LAWS OF LIGHT PROPAGATION

(75) Inventors: Laurent Jeannot, Marcilly sur Tille (FR); Francis Lamy, Arnay le Duc (FR)

(73) Assignee: Commissariat a l'Energie Atomique, Paris (FR)

( * ) Notice: Subject to any disclaimer, the term of this patent is extended or adjusted under 35 U.S.C. 154(b) by 681 days.

This patent is subject to a terminal disclaimer.

(21) Appl. No.: 11/660,828

(22) PCT Filed: Sep. 7, 2005

(86) PCT No.: PCT/FR2005/050716

§ 371 (c)(1), (2), (4) Date: Nov. 16, 2007

(87) PCT Pub. No.: WO2006/030149

PCT Pub. Date: Mar. 23, 2006

(65) Prior Publication Data

US 2008/0074680 A1    Mar. 27, 2008

(51) Int. Cl.
*G01B 11/24* (2006.01)
(52) U.S. Cl. .................................................. 356/601
(58) Field of Classification Search ............... 356/432, 356/601, 630, 632
See application file for complete search history.

(56) References Cited

U.S. PATENT DOCUMENTS

| | | | | |
|---|---|---|---|---|
| 4,121,247 A | * | 10/1978 | Henry | 348/135 |
| 4,168,907 A | | 9/1979 | Presby | 356/73.1 |
| 4,227,806 A | | 10/1980 | Watkins | 356/73.1 |
| 4,859,861 A | * | 8/1989 | Mersch | 250/559.22 |
| 5,118,954 A | * | 6/1992 | Grosso | 250/559.24 |
| 5,289,265 A | * | 2/1994 | Inoue et al. | 356/632 |
| 5,291,271 A | * | 3/1994 | Juvinall et al. | 356/632 |

(Continued)

FOREIGN PATENT DOCUMENTS

EP    0294889 A1    12/1988

(Continued)

OTHER PUBLICATIONS

International Seach Report, PCT/FR2005/050716, 3 pgs, (Feb. 14, 2007).

(Continued)

*Primary Examiner*—Roy Punnoose
(74) *Attorney, Agent, or Firm*—Nixon Peabody LLP

(57) ABSTRACT

According to the invention, to measure an object (32), for example a hollow, translucent or transparent sphere with respect to a visible light, using Snell-Descartes laws, relating to the propagation of light through the object, an equation is established which associates optogeometric parameters of the object with the result of an observation performed directly on an image of the object, said image being acquired by observing said object, by single-view optical shadowgraphy, said image is acquired, the observation is performed, and at least one geometric or optical parameter of the object is determined using the equation and the result of the observation.

13 Claims, 4 Drawing Sheets

U.S. PATENT DOCUMENTS 6,285,451 B1 * 9/2001 Herron ............... 356/630
6,651,502 B1 * 11/2003 Davis ................. 73/606
7,307,740 B2 12/2007 Lamy et al.

FOREIGN PATENT DOCUMENTS

| FR | 2651312 A1 | 3/1991 |
| FR | 2852389 A1 | 9/2004 |
| FR | 2875295 A1 | 3/2006 |
| WO | 2004/083772 A2 | 9/2004 |
| WO | 2006030149 A1 | 3/2006 |
| WO | 2007110395 A1 | 10/2007 |

OTHER PUBLICATIONS

Haralick, Robert M., "Digital Step Edges From Zero Crossing of Second Directional Derivatives", IEEE Transactions on Pattern Analysis and Machine Intelligence, vol. PAMI-6, No. 1, pp. 58-68, (Jan. 1984).

U.S. Appl. No. 10/547,783, Title "Method for Measuring Three-Dimensional Objects by Single View Backlit Shadowgraphy", pp. 1-23, Inventors Francis Lamy et al., filed (Sep. 6, 2005).

International Search Report, PCT/FR2005/050716, dated Feb. 14, 2006 (6 pages).

International Search Report, PCT/EP2007/058690, dated Oct. 9, 2007 (10 pages).

* cited by examiner

METHOD FOR MEASURING THREE-DIMENSIONAL OBJECTS BY SINGLE-VIEW OPTICAL SHADOWGRAPHY, USING THE OPTICAL LAWS OF LIGHT PROPAGATION

CROSS REFERENCE TO RELATED APPLICATIONS OR PRIORITY CLAIM

This application is a national phase of International Application No. PCT/FR2005/050716 entitled "Method For Measuring Three-Dimensional Objects By Single View Backlit Shadowgraphy Using Optical Laws Of Light Propagation", which was filed on Sep. 7, 2005, which was not published in English, and which claims priority of the French Patent Application No. 04 52018 filed Sep. 10, 2004.

TECHNICAL FIELD

This invention relates to a method for measuring, or characterising, without contact, three-dimensional object, and more specifically three-dimensional objects that are transparent to visible light or at least translucent with respect to this light.

The invention applies in particular to:
- the contactless measurement of the thickness of a hollow and transparent spherical object (more simply called "sphere") or a hollow and transparent cylindrical object (more simply called "cylinder"),
- the contactless measurement of the thickness of a transparent layer or a transparent deposit, placed inside such a sphere or such a cylinder,
- the contactless measurement of the deformation or the roughness of the internal surface of such a sphere or such a cylinder,
- the contactless measurement of the deformation or the roughness of a transparent layer or a transparent deposit, placed inside such a sphere or such a cylinder, and
- the measurement of the refraction index of a material constituting such a sphere or such a cylinder that has been formed.

PRIOR ART

For the contactless measurement of a three-dimensional object, it is known to use three-dimensional tomography.

However, this technique makes it necessary to observe the object under a plurality of incidences, which is not possible if the object is placed in a complex infrastructure.

If the object is three-dimensional, it is also known to use a so-called "single-view tomography" technique.

According to this latter technique, an image is formed by means of a calculation code based on an object model chosen beforehand.

The image thus obtained is compared to a simulated radiographic image and the model is then deformed iteratively until the simulated image coincides with the experimental image.

The reconstruction is based on the hypothesis of rotational symmetry of the object.

Single-view tomography is thus a technique that is complex and difficult to implement.

In addition, to measure thicknesses and diameters of hollow spheres, it is known to use interferometry and X-ray radiography.

Interferometry is a precise method that can be used in a complex infrastructure, but it is relatively difficult to implement.

X-ray radiography cannot be used when the object to be measured is placed in a complex infrastructure and cannot be manipulated from outside of said infrastructure.

Thus, many difficulties are encountered in the contactless measurement of the dimensions of a three-dimensional and transparent (or translucent) object, in particular when an internal characteristic of the object is to be measured.

A backlit shadowgraphy method is described in the following document:

French patent application no. 03 50045, filed on 12 Mar. 2003, invention by F. Lamy et al.

However, this method requires the creation of a data table based on simulations carried out by means of a suitable software program, and this table must cover the entire range of dimensions of object to be observed. The data make it possible to obtain, by interpolation, a dimensional measurement of the object studied; but the wider the range of dimensions to be covered by the data table, the longer the creation of this table will take if a certain precision is to be maintained.

DESCRIPTION OF THE INVENTION

This invention is intended to overcome the aforementioned disadvantages.

To do this, it uses an optical shadowgraphy measurement technique, which is applied to the characterisations of objects that can be observed under a single angle of view, in particular if it is difficult to access these objects. In addition, the invention preferably uses an image acquisition system that is focused on a plane of the object studied.

Furthermore, the objects to be characterised by means of the method of the invention are essentially hollow spheres or hollow cylinders. However, the method of production of the sphere or cylinder can involve a modification in the optical index with respect to that of the bulk material from which said sphere or said cylinder was produced.

The present invention also makes it possible to overcome this disadvantage: combined with suitable means, it makes it possible, as will be seen, to determine the refraction index of an object with spherical or cylindrical symmetry.

The method of the invention has the advantage of using the optical laws of Snell-Descartes, relating to the propagation of light. Thus, the shadowgraphic observation is used directly with a simple formula that associates the optical characteristics (refraction index) and the dimensions of the object with the shadowgraphic image of the latter.

This method has the advantage of being fast and precise and makes it possible to measure highly varied dimensions of objects, regardless of the size of the latter, within the resolution limit of the measuring apparatus used.

More precisely, this invention relates to a method for contactless measurement of a three-dimensional object, said three-dimensional object being translucent or transparent to visible light, said method being characterised in that:
- by way of the Snell-Descartes laws relating to the propagation of visible light through the object, an equation is established that associates the optogebmetric parameters of the object with the result of an observation performed directly on an image of the object, said image being acquired by observing said object with the visible light, by single-view optical shadowgraphy,
- this image of the object is acquired,
- the observation is performed, and at least one geometric or optical parameter of the object is determined using the equation and the result of the observation.

The image is preferably acquired by means of a visible light image acquisition system, by focusing said image acquisition system on a section plane of the object studied.

It is possible to determine, according to the invention, the geometric or optical parameter of a hollow object based on the image of a planar section of the object.

According to a specific embodiment of the method of the invention, the object is a hollow sphere or a hollow cylinder, said object thus has a wall; the geometric parameter of the object is the thickness of this wall, the image of the hollow sphere or the hollow cylinder comprises a light ring, the equation is $$\frac{\pi}{2} + \arcsin\left(\frac{R_a}{n_1 \cdot R_2}\right) - \arcsin\left(\frac{R_a}{n_1 \cdot R_1}\right) + \arcsin\left(\frac{R_a}{R_1}\right) - 2 \cdot \arcsin\left(\frac{R_a}{R_2}\right) = 0$$

where $n_1$, $R_1$, $R_2$ and $R_a$ respectively represent the refraction index, the external radius, the internal radius of the sphere or the cylinder and the radius of the light ring, wherein the external radius of the sphere or cylinder and the radius of the light ring are determined on the basis of the image of the object and, $n_1$ being known, the thickness $R_1$-$R_2$ of the wall is determined on the basis of the external radius of the sphere or cylinder and on the basis of the radius of the light ring, by means of the equation.

According to a specific embodiment of the invention, the object is hollow and contains a layer or a deposit of a material that is transparent or translucent, and the thickness of said deposit or said layer is determined.

In this case, according to another specific embodiment of the method of the invention, the object is a hollow sphere or a hollow cylinder, the geometric parameter of the object is the thickness of the layer or of the deposit, the image of the hollow sphere or hollow cylinder comprises a light ring, the equation is $$\frac{\pi}{2} - \arcsin\left(\frac{R_a}{R_1}\right) + \arcsin\left(\frac{R_a}{n_1 \cdot R_1}\right) - \arcsin\left(\frac{R_a}{n_1 \cdot R_2}\right) + \arcsin\left(\frac{R_a}{n_2 \cdot R_2}\right) - \arcsin\left(\frac{R_a}{n_2 \cdot R_3}\right) = 0$$

where $n_1$, $n_2$, $R_1$, $R_2$, $R_3$ and $R_a$ respectively represent the refraction index of the sphere or cylinder, the refraction index of the layer or the deposit, the external radius of the sphere or cylinder, the internal radius of the sphere or cylinder, the internal radius of the layer or deposit and the radius of the light ring, wherein the external radius of the sphere or cylinder and the radius of the light ring are determined on the basis of the image of the object and, $n_1$, $n_2$ and $R_2$ being known, the thickness $R_2$-$R_3$ of the layer or the deposit is determined on the basis of the external radius of the sphere or cylinder and on the basis of the radius of the light ring, by means of the equation.

The external radius can be determined using the method of directional derivatives.

According to another specific embodiment of the invention, the object is hollow and comprises an internal wall, and the deformation or the roughness of this internal wall is determined.

According to another specific embodiment of the invention, the object is a hollow sphere or a hollow cylinder, the optical parameter of the object is the refraction index of said object, the image of the hollow sphere or the hollow cylinder comprises a light ring, the equation is $$\frac{\pi}{2} + \arcsin\left(\frac{R_a}{n_1 \cdot R_2}\right) - \arcsin\left(\frac{R_a}{n_1 \cdot R_1}\right) + \arcsin\left(\frac{R_a}{R_1}\right) - 2 \cdot \arcsin\left(\frac{R_a}{R_2}\right) = 0$$

where $n_1$, $n_2$, $R_1$, $R_2$ and $R_a$ respectively represent the refraction index, the external radius, the internal radius of the sphere or cylinder, and the radius of the light ring, wherein the radius of the light ring is determined on the basis of the image of the object, $R_1$ and $R_2$ are determined and the refraction index $n_1$ is determined at the wavelength of the visible light with which the object is observed, by means of the equation.

It is possible to determine $R_1$ and $R_2$ by radiography.

According to a preferred embodiment of the invention, an optical shadowgraphy device is used, which includes a visible light source, means for collimation of this source and image acquisition means, comprising an optic and an image sensor, said optic being placed between the object and the image sensor and making it possible to form the image of the section plane of the object studied on the image sensor, and the collimation of the source is adjusted.

The image sensor can include a charge transfer device.

The method of the invention has advantages: its implementation cost is low and the material needed for this implementation is relatively easy to use in a complex infrastructure, because said material is limited to a light source (equipped with collimation means), an optic and a camera.

BRIEF DESCRIPTION OF THE DRAWINGS

This invention can be better understood on reading the following description of embodiment examples, provided solely for illustrative purposes and non-limiting purposes, with reference to the appended drawings in which.

DETAILED DESCRIPTION OF SPECIFIC EMBODIMENTS

The measurement principle, which is used in the invention for the measurement of an object, is based on the observation of the object by visible-light shadowgraphy, in association with an optical model for light propagation.

This measurement principle takes into account the physical phenomena of light propagation in the various translucent or transparent materials comprised by the object, in particular at the various interfaces of the object, and makes it possible to associate the measurement performed directly on the shadowgraphy image with the internal physical dimensional quantities of the object studied.

Indeed, to study a planar object, shadowgraphy is an inexpensive and simple method of measurement. By a direct measurement on the image of the object, it is possible to know, for example, the size of the object.

However, to study an object in three dimensions by shadowgraphy, the direct analysis of the image does not provide enough information because the observed image of a cross-section of the object is not only the image of the cross-section through the objective of the shadowgraphy device used, but also the image of the cross-section through the objective and the object itself.

It is possible to find the characteristics of the cross-section studied if the influence of the object on the propagation of the incident light beam is known. This influence can be described by the equations of geometrical optics, which involve the Snell-Descartes laws.

We should note that tomography, which is commonly used to study a three-dimensional object, makes it necessary to observe this object under a plurality of incidences, which is not possible if the object is placed in a complex infrastructure.

The authors of this invention have in particular conducted a study on hollow spheres. It is difficult to know their thickness by a direct measurement on their shadowgraphic images, because the light rays are refracted and reflected on the various internal and external interfaces of such spheres.

In the shadowgraphic images of a hollow sphere, a light ring appears, which results from a specific light propagation path in the sphere. This light ring is the main element upon which a measurement method according to the invention is based.

The authors of this invention have developed the study for spheres composed of a plurality of layers and have shown that it is possible to measure the thickness of the innermost layer by shadowgraphy, inasmuch as the other dimensional characteristics are known.

Below, we describe an example of the invention, and begin by explaining the highlighting of a white band in the image of a hollow sphere, which is obtained by single-view optical shadowgraphy.

Figure 1A:
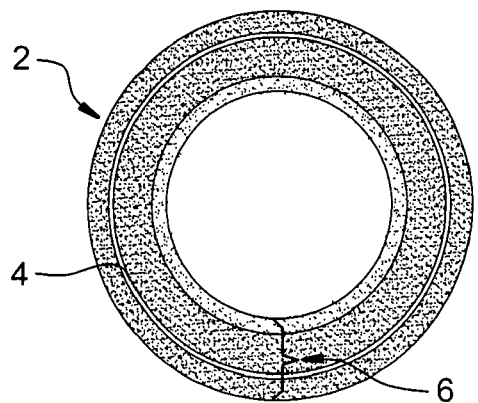
FIGS. 1A and 1B respectively show a real image and a simulated image of a hollow sphere.

FIG. 1A diagrammatically shows an image 2 of a real hollow sphere. The external radius of this sphere is 578 µm and its thickness is 66 µm.

Figure 1B:
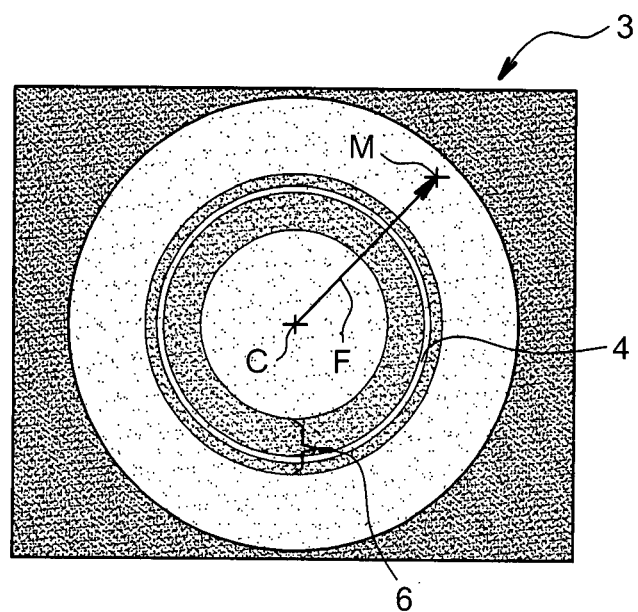

It is also possible to form a simulated image 3 of such a hollow sphere (FIG. 1B). In the example considered, the external radius of the simulated sphere is 1000 µm and its thickness is 100 µm.

In FIG. 1A, the presence of a light ring 4 and a black area 6 is observed (the corresponding elements of FIG. 1B have the same references). It is noted that:

the radius of the white ring is associated with the thickness of the hollow sphere, the width of the black zone depends on the numerical aperture of the image acquisition system of the shadowgraphy device used.

To better assess the position of the white band (or light ring), it is possible to form a profile of the simulated image, said profile having, as its origin, the centre C of the simulated image, and, as the terminating point, a point M outside of the sphere, as shown by the arrow F of FIG. 1B. In the example shown, the distance CM is 1.25 mm.

Figure 1C:
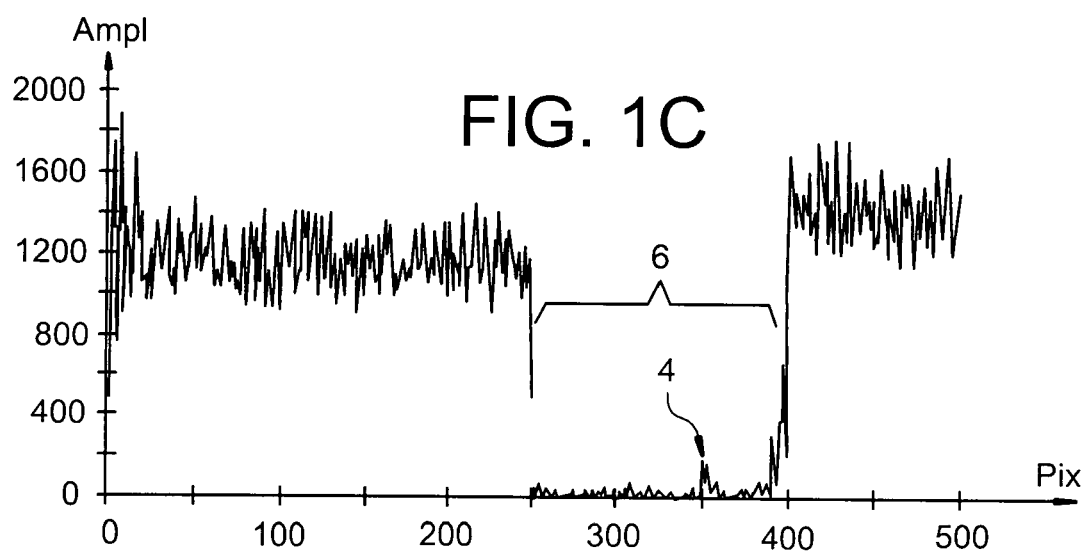
FIG. 1C shows the profile of a half-line of the simulated image of FIG. 1B, FIG. 2A diagrammatically shows the preferred propagation path of the light rays through the hollow sphere, which rays are the source of the formation of the light ring present in the images of FIGS. 1A and 1B, FIG. 2B diagrammatically shows the geometry used to calculate the relationship between various parameters $R_a$, $R_1$, $R_2$ and $n_1$ which will be defined below, in the case of a hollow sphere, FIG. 2C diagrammatically shows the geometry used to calculate the relationship between $R_a$, $R_1$, $R_2$, $R_3$, $n_1$, $n_2$ in the case of a hollow sphere, coated with an internal layer.

FIG. 1C shows the profile of a half-line of the simulated image, the numbers of the pixels (Pix) being in the x-axis and the amplitudes (grey levels) in the y-axis (Ampl).

In this FIG. 1C, the light ring 4 and the black zone 6 have been identified.

We will now consider the use of geometric optics relationships in this invention.

The light rings created by the passage of a collimated light beam to the inside of a transparent (or translucent) hollow sphere can have very complex trajectories. Like rainbows, each ring characterises a mode of propagation through the dioptres encountered, with energy distributions that vary according to the number of refractions and reflections that take place.

As the observation objective used focuses in the equatorial plane of the hollow sphere, it is simply necessary to obtain, by geometric construction, the point of impact between the outgoing light rays and said equator in order to find the position of the light ring observed for a given propagation path.

First, the case of a hollow "single-layer" sphere, i.e. a simple hollow sphere comprising no internal layer, is considered.

Figure 2A:
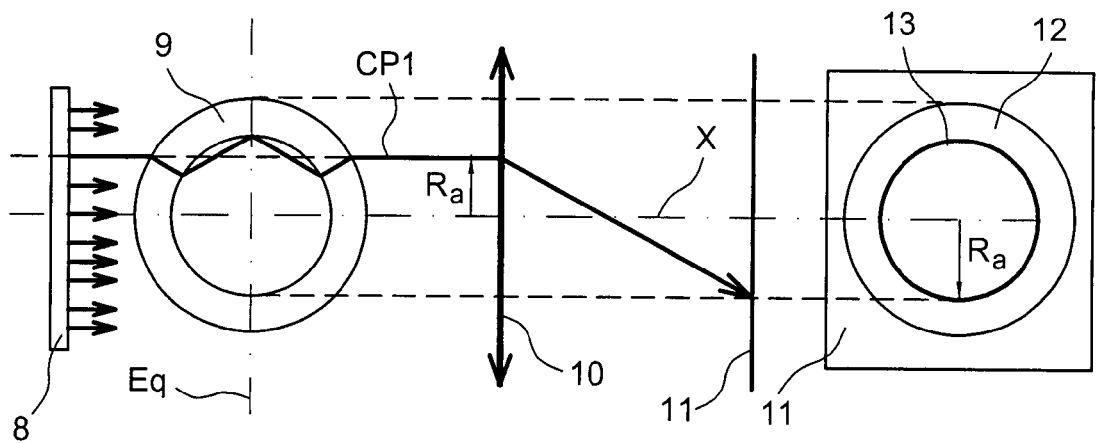

By simulation it was shown that the propagation path of the light rays through the hollow sphere, said rays being the source of the formation of the light ring present in the images of FIGS. 1A and 1B, is preferably that shown in FIG. 2A.

This figure shows a collimated light source 8, the transparent hollow sphere studied 9 and a focusing lens 10. The sphere is placed between the source and said lens. The image of the sphere is formed on a screen 11 by means of the lens.

A ray tracing is shown diagrammatically for an observation configuration at a distance $2f$ from the lens, f being the focal distance of said lens.

A front view of the screen 11 has also been shown, with the image of the sphere referenced 12. The light ring observed in this image is referenced 13. The radius of this ring is denoted $R_a$. This radius is calculated from the optical axis X of the lens, which also constitutes the axis of emission of the source 8. The screen 11 is perpendicular to said axis. The equatorial plane of the sphere 9, which is perpendicular to the axis X, is denoted Eq.

If we take, as the specific light ray, the one observed without deviation from the axis of emission of the source, the calculations for analytically determining the relationship between the radius of the light ring $R_a$, the external radius of the sphere $R_1$, its internal radius $R_2$ and its refraction index $n_1$ are simplified due to symmetry.

By simulation with ray tracing software, it can be seen that the ray tracing of FIG. 2A is characteristic of the most intense light ring observed.

It can simply be considered that the radius of the light ring is equal to the height of the light ray coming from the collimated source that reaches the internal surface of the sphere at the level of its equator.

Figure 2B:
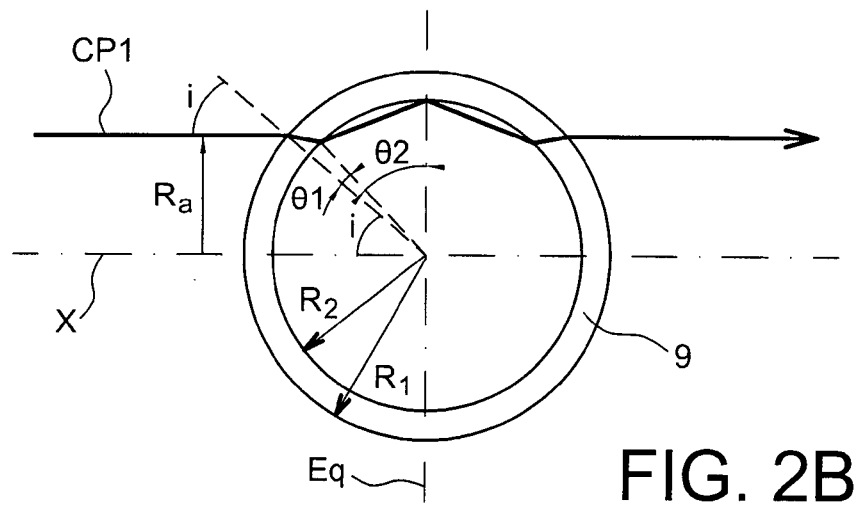

FIG. 2B shows a diagram that is used to calculate the relationship between the radius of the ring $R_a$, the external radius $R_1$ of the hollow sphere 9, the internal radius $R_2$ thereof and the refraction index $n_1$ of the material with which said sphere is made.

The calculation of the radius of the ring on the basis of $R_1$, $R_2$ and $n_1$ is then carried out as shown below.

The Snell-Descartes refraction laws are applied at the level of each dioptre encountered by the incident light ray.

The relationship between $R_1$, $R_2$, $n_1$ and $R_a$ is obtained by writing that the sum of the angles i, θ1 and θ2 of FIG. 2B is equal to 90°. In this case, the light ray that is parallel to the observation direction is reflected on the dioptre inside the sphere, exactly at the equator thereof.

The following relation easily results from this:

$$\frac{\pi}{2} + \arcsin\left(\frac{R_a}{n_1 \cdot R_2}\right) - \arcsin\left(\frac{R_a}{n_1 \cdot R_1}\right) + \arcsin\left(\frac{R_a}{R_1}\right) - 2 \cdot \arcsin\left(\frac{R_a}{R_2}\right) = 0 \quad (1)$$

A numerical resolution of the equation (1) makes it possible to determine the value of the thickness $R_1$-$R_2$ when $R_a$ and $R_1$ are measured by shadowgraphy, considering that $n_1$ is known insofar as the nature of the material constituting the sphere and the wavelength of the light emitted by the source 8 are known.

We will now consider the case of a hollow "bilayer" sphere. An example of such a sphere is shown diagrammatically in FIG. 2C. It is a transparent or translucent hollow sphere 14, which is of the type of the sphere 9 of FIG. 2A, but of which the internal wall is additionally coated with a translucent or transparent layer 16.

Figure 2C:
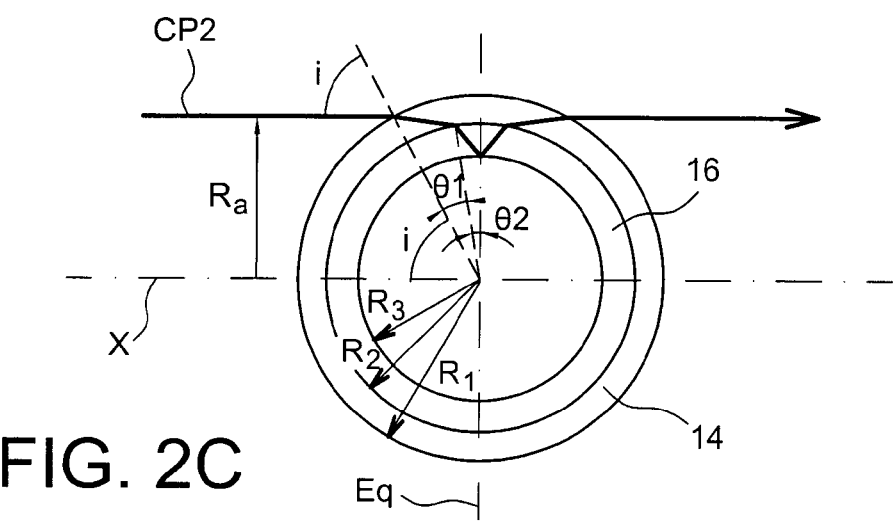

In the case of such a bilayer sphere, the propagation path of the light rays through the sphere, which rays are the source of the formation of the light ring, is preferably the one shown in FIG. 2C, referenced CP2.

This FIG. 2C diagrammatically shows the geometry used to calculate the relationship between $R_a$, $R_1$, $R_2$, $R_3$, $n_1$ and $n_2$ in the case of the bilayer hollow sphere, all of these parameters being defined below.

As above, the following relationship between the external radius $R_1$ of the sphere 14, the internal radius $R_2$ of said sphere, the internal radius $R_3$ of the layer 16, the radius $R_a$ of the light ring, the refraction index $n_1$ of the sphere and the refraction index $n_2$ of the layer:

$$\frac{\pi}{2} - \arcsin\left(\frac{R_a}{R_1}\right) + \arcsin\left(\frac{R_a}{n_1 \cdot R_1}\right) - \arcsin\left(\frac{R_a}{n_1 \cdot R_2}\right) + \arcsin\left(\frac{R_a}{n_2 \cdot R_2}\right) - \arcsin\left(\frac{R_a}{n_2 \cdot R_3}\right) = 0 \quad (2)$$

A numerical resolution of the equation (2) makes it possible to determine the value of the thickness $R_2$-$R_3$ when $R_a$ and $R_1$ are measured by shadowgraphy, considering that $n_1$ and $n_2$ are known insofar as the materials respectively constituting the sphere 14 and the layer 16, the wavelength of the light emitted by the source used for the shadowgraphy, and the radius $R_2$ are known.

The latter can, for example, be determined using the equation (1), by applying, to a sphere identical to sphere 14 but without the layer 16, the method applied to sphere 9.

We will now consider an image processing algorithm used to implement a method according to the invention.

In the images obtained by single-view shadowgraphy for a hollow sphere (initial image and image after histogram equalisation), we can detect the external radius of the sphere, then the position of the white band.

To determine the external radius, we preferably use the method of directional derivatives. The following document can be consulted on this topic:

R. M. Haralick, "Digital Step Edges from Zero Crossing of Second Directional Derivatives", IEEE Transactions on pattern analysis and machine intelligence, vol. PAMI-6, No. 1, January 1984, p. 58-68.

This method is based on the cancellation of the image gradient and on the maximisation of the second derivative.

Thus, we obtain a centre and a radius corresponding to the external surface of the sphere. From the centre, radial profiles are traced to all degrees.

Figure 3:
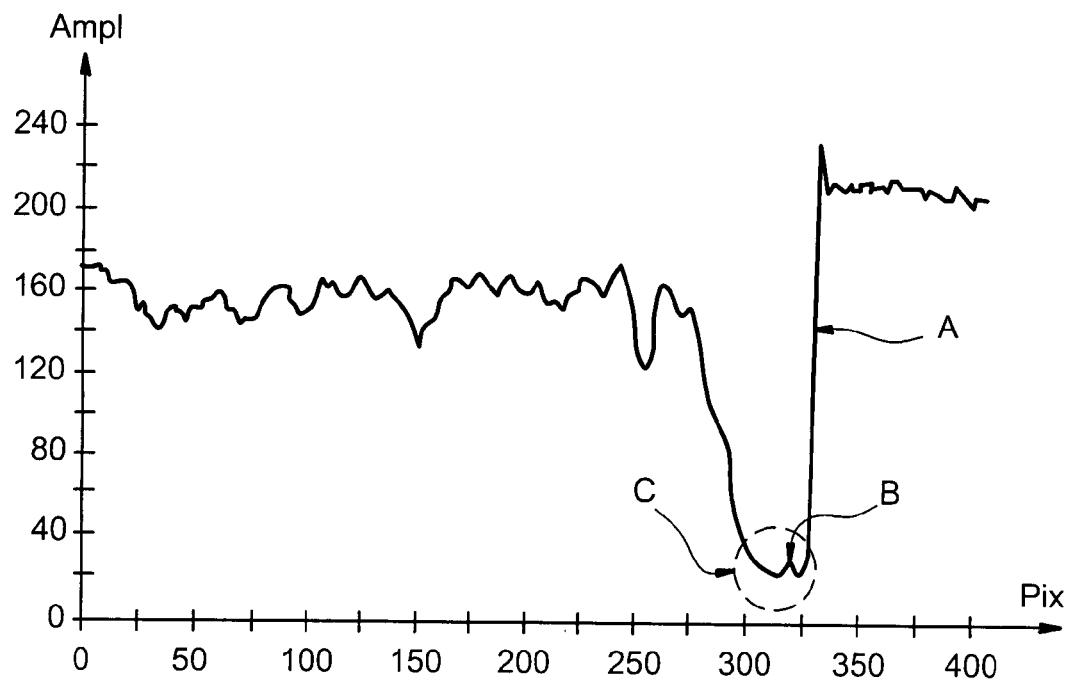
FIG. 3 shows a radial profile of an image to be processed.

FIG. 3 shows one of these profiles. The numbers of the pixels (Pix) are shown on the x-axis and the amplitudes (grey levels) are shown on the y-axis (Ampl).

For each profile, we search for the point representing the position of the external surface (point A) and the position of the white band (point B).

Point A is obtained by cancelling the second derivative. Point B is obtained by reducing the study area of the profile (to the area defined by the circle C in the example shown) and by searching the local maximum. To have a sub-pixel coordinate, the profile is adjusted locally to a Gaussian law.

Once these operations have been completed, the thickness of the sphere, for this radius, is obtained by using the equation of the model. The internal and external surfaces of the sphere are reconstructed, and it is then possible to know the mean thickness of the sphere on the equator thereof.

As regards the method of the invention, we consider there to be an uncertainty on the order of ±3 pixels for the detection of the external radius, and on the order of ±0.5 pixel for the determination of the position of the white band.

The shadowgraphic method for measuring the thickness of a hollow sphere according to the invention has the advantage of being inexpensive and capable of being implemented very easily and quickly.

The use of this method requires a careful choice of the numerical aperture of the image acquisition system contained in the shadowgraphy device used, and of the emission diagram of the light source contained in this device, so as to obtain the optimal conditions for correctly displaying the white band or light ring.

The uncertainty of the measurement is essentially dependent on the spatial resolution of the image. In the examples of the invention considered, the centre of the sphere is observed so as to be capable of tracing the radial profiles. Thus, the larger the radius of the sphere is, the larger the micrometer per pixel conversion coefficient is, and therefore the greater the uncertainty of the measurement is. This uncertainty of the measurement therefore depends on the radius of the sphere studied.

The equipment used for the shadowgraphy is conventional. It includes a collimated light source, which transmits a visible light and which is associated with an image acquisition system that is intended to be focused on a plane of the object studied.

Figure 4:
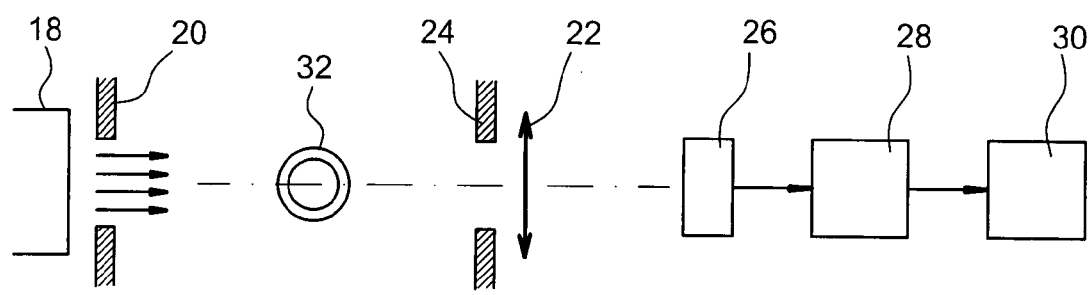
FIG. 4 is a diagrammatic view of a device making it possible to implement a method according to the invention.

FIG. 4 is a diagrammatic view of a shadowgraphy device for implementing the method of the invention.

This device includes a visible light source 18, means 20 for adjustable collimation of said source and image acquisition means, comprising an optical element 22 that is equipped with means 24 for varying the numerical aperture of said optical element (or that has the appropriate numeric aperture).

A hollow sphere 32 to be studied is placed between the source 18 and the optical element 22. This optical element 22 makes it possible to form the image of a section plane of the hollow sphere 32 on the CCD sensor 26.

A hollow sphere 32 to be studied is placed between the source 18 and the optic 22. This optic 22 makes it possible to form the image of a section plane of the hollow sphere 32 on the CCD sensor 26.

The invention essentially relates to the method used to determine the thickness of the hollow sphere, namely:

determination of the experimental conditions conducive to a simple detection of the radius of the light ring (numerical aperture of the image acquisition system, collimation of the light source), development of the mathematical equation based on the characteristics of the object studied and on the phenomenon observed on the image (external radius, thickness of the sphere, radius of the light ring and refraction index of the object), and associated image processing to determine the initial parameters (radius of the light beam and external radius of the sphere) in order to finally determine the desired dimension of the object (thickness of the hollow sphere, in the example considered).

The same method can be implemented in order to characterise the thickness of a hollow cylinder. For this implementation, the device of FIG. 4 (same light source and same image acquisition device) can be used, with the cylinder in the place of the sphere 32.

In the shadowgraphic image obtained, a white band appears, which is associated with the thickness and the external radius of the cylinder.

The equation (1) is also applied to a hollow cylinder. Similarly, the equation (2) is applied to a hollow cylinder, of which the internal wall is coated with a translucent or transparent layer (or a deposit).

Figure 5A:
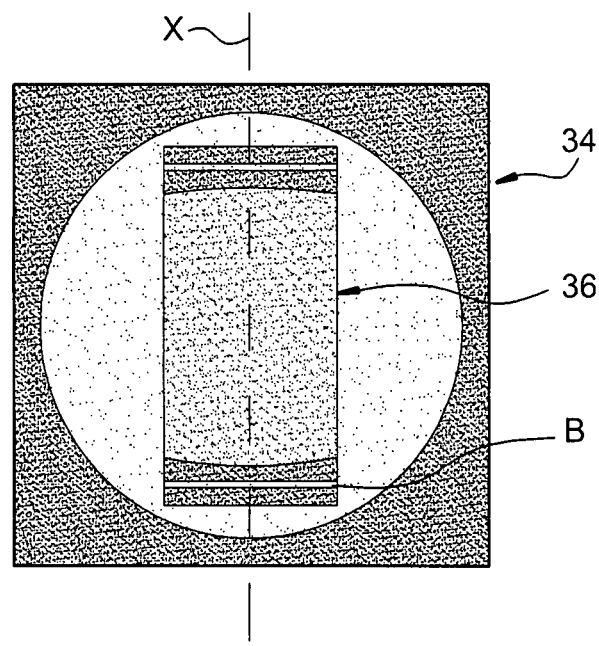
FIG. 5A shows the shadowgraphic image of a hollow cylinder.
Figure 5B:
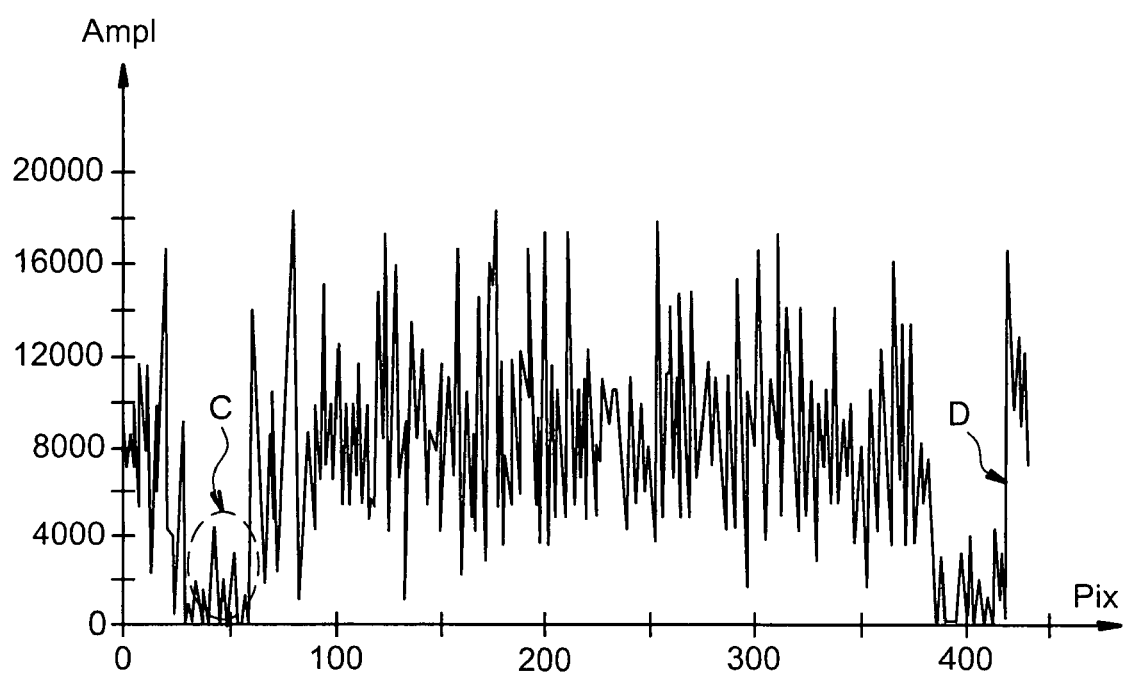
FIG. 5B shows the profile of the image of FIG. 5A.

FIG. 5A shows the shadowgraphic image 34 of a hollow cylinder with an external radius of 1000 µm and a thickness of 300 µm. The profile of this image is shown in FIG. 5B. This profile is traced according to line X of FIG. 5A.

A white band B is seen in FIG. 5A. This white band corresponds to area C in FIG. 5B. In the latter figure, the edge of the cylinder is identified by the arrow D. The position of the white band is associated with the external radius and the thickness of the hollow cylinder.

The knowledge of the distance between the centre of the light ring and each point of the latter makes it possible to determine the surface state of the internal wall of the hollow cylinder, in terms of deformation and roughness, according to an equator or two generators of the cylinder, in the observation plane (which is perpendicular to the optical observation axis).

In the case of a bilayer object, i.e. a hollow object on the internal wall of which a so-called internal layer is formed, the method of the invention makes it possible to measure the thickness of the internal layer insofar as the thickness of the wall of the object, called the external wall, is known, which is then measured beforehand. The roughness and deformation of the internal surface of the bilayer object can also be measured.

The above applies both to cylinders and to spheres.

The method of the invention can be used regardless of the diameter of the sphere or the cylinder. Indeed, the use of an optical chain with a suitable magnification coefficient makes it possible to observe the entirety of an object on a CCD sensor measuring 6.6 mm by 8.8 mm. It is even possible to observe a single portion of the object, provided that a suitable optical system is used.

The only restriction involved in the measurement of the thickness of the hollow sphere is that it be relatively thick in order for it to be easy to distinguish the white band, given the resolution of the optical system.

In the measurement of the thickness of a hollow object, for example a hollow sphere, according to the invention, it is necessary to take into account the resolution of the optical system used for this measurement: for a given resolution, the sphere must be thick enough for it to be possible to easily distinguish the white band.

This invention also relates to the characterisation of the refraction index of transparent or translucent objects, more specifically such objects which are additionally spherical or cylindrical.

By using the relation (1), it is possible to determine, by shadowgraphy and in a non-destructive manner, the refraction index of a sphere or a cylinder of which the dimensions will be characterised by means of another measurement system, preferably a radiography system.

This refraction index is then given at the wavelength of the light source used for the shadowgraphic measurement.

In general, the index measurement is done by ellipsometry, but is relates only to planar objects. This invention makes it possible to overcome this disadvantage because it is applied to three-dimensional objects.

Moreover, the mechanical stresses caused in the production of objects, more specifically spherical or cylindrical objects, can result in a modification of the refraction index of such objects. The invention makes it possible advantageously to determine the new refraction index.

The invention claimed is:

1. Method for contactless measurement of a hollow spherical object or hollow cylindrical object, said hollow spherical object or hollow cylindrical object being translucent or transparent to visible light, said method being characterised in that:

performing, with visible light, an observation directly on the object to acquire an image thereof, the image comprising a light ring and based on single-view optical shadowgraphy;

determining the radius of the object from the image of the object;

by way of the Snell-Descartes laws relating to the propagation of visible light through the object, establishing an equation that associates optical parameters and geometric parameters of the object with the result of the observation, the equation containing the radius of the light ring;

determining at least one geometric or optical parameter of the object using the equation, the radius of the light ring and the result of the observation, and displaying the geometric or optical parameter.

2. Method according to claim 1, wherein the image is acquired by means of a visible light image acquisition system, by focusing said image acquisition system on a section plane of the object studied.

3. Method according to claim 2, wherein the object is hollow, and the geometric or optical parameter of said hollow object is determined on the basis of the image of a planar section of the object.

4. Method according to claim 3, wherein the object is a hollow sphere or a hollow cylinder, said object thus having a wall, the geometric parameter of the object is the thickness of this wall, the image of the hollow sphere or the hollow cylinder comprises a light ring, the equation is $$\frac{\pi}{2} + \arcsin\left(\frac{R_a}{n_1 \cdot R_2}\right) - \arcsin\left(\frac{R_a}{n_1 \cdot R_1}\right) + \arcsin\left(\frac{R_a}{R_1}\right) - 2 \cdot \arcsin\left(\frac{R_a}{R_2}\right) = 0$$

where $n_1$, $R_1$, $R_2$ and $R_a$ respectively represent the refraction index, the external radius, the internal radius of the sphere or the cylinder and the radius of the light ring, wherein the external radius of the sphere or cylinder and the radius of the light ring are determined on the basis of the image of the object and, $n_1$ being known, the thickness $R_1$-$R_2$ of the wall is determined on the basis of the external radius of the sphere or cylinder and on the basis of the radius of the light ring, by means of the equation.

5. Method according to claim 4, wherein the external radius is determined using the method of directional derivatives.

6. Method according to claim 3, wherein the object is a hollow sphere or a hollow cylinder, the optical parameter of the object is the refraction index of said object, the image of the hollow sphere or the hollow cylinder comprises a light ring (14), the equation is $$\frac{\pi}{2} + \arcsin\left(\frac{R_a}{n_1 \cdot R_2}\right) - \arcsin\left(\frac{R_a}{n_1 \cdot R_1}\right) + \arcsin\left(\frac{R_a}{R_1}\right) - 2 \cdot \arcsin\left(\frac{R_a}{R_2}\right) = 0$$

where $n_1$, $n_2$, $R_1$, $R_2$ and $R_a$ respectively represent the refraction index, the external radius, the internal radius of the sphere or cylinder, and the radius of the light ring, wherein the radius of the light ring is determined on the basis of the image of the object, $R_1$ and $R_2$ are determined and the refraction index $n_1$ is determined at the wavelength of the visible light with which the object is observed, by means of the equation.

7. Method according to claim 6, wherein $R_1$ and $R_2$ are determined by radiography.

8. Method according to claim 2, wherein the object is hollow and contains a layer or a deposit of a material that is transparent or translucent, and the thickness of said deposit or said layer is determined.

9. Method according to claim 8, wherein the object is a hollow sphere or a hollow cylinder, the geometric parameter of the object is the thickness of the layer or of the deposit, the image of the hollow sphere or hollow cylinder comprises a light ring, the equation is $$\frac{\pi}{2} - \arcsin\left(\frac{R_a}{R_1}\right) + \arcsin\left(\frac{R_a}{n_1 \cdot R_1}\right) - \arcsin\left(\frac{R_a}{n_1 \cdot R_2}\right) + \arcsin\left(\frac{R_a}{n_2 \cdot R_2}\right) - \arcsin\left(\frac{R_a}{n_2 \cdot R_3}\right) = 0$$

where $n_1$, $n_2$, $R_1$, $R_2$, $R_3$ and $R_a$ respectively represent the refraction index of the sphere or cylinder, the refraction index of the layer or the deposit, the external radius of the sphere or cylinder, the internal radius of the sphere or cylinder, the internal radius of the layer or deposit and the radius of the light ring, wherein the external radius of the sphere or cylinder and the radius of the light ring are determined on the basis of the image of the object and, $n_1$, $n_2$ and $R_2$ being known, the thickness $R_2$-$R_3$ of the layer or the deposit is determined on the basis of the external radius of the sphere or cylinder and on the basis of the radius of the light ring, by means of the equation.

10. Method according to claim 9, wherein the external radius is determined using the method of directional derivatives.

11. Method according to claim 2, wherein the object is hollow and comprises an internal wall, and the deformation or the roughness of this internal wall is determined.

12. Method according to claim 2, wherein an optical shadowgraphy device is used, which includes a visible light source, means for collimation of this source and image acquisition means, comprising an optical element and an image sensor, said optical element being placed between the object and the image sensor and making it possible to form the image of the section plane of the object studied on the image sensor, and the collimation of the source is adjusted.

13. Method according to claim 12, wherein the image sensor includes a charge transfer device.

\* \* \* \* \*